United States Patent [19]

Walls

[11] 4,429,435
[45] Feb. 7, 1984

[54] HEAT STRIP HOLDER FOR SKEWER STICKS

[76] Inventor: James F. Walls, Box 181, Smyrna, Tenn. 37167

[21] Appl. No.: 343,018

[22] Filed: Jan. 26, 1982

[51] Int. Cl.³ ............................................. A47J 43/28
[52] U.S. Cl. ..................................................... 17/1 S
[58] Field of Search ................................. 17/1 R, 1 S

[56] References Cited

U.S. PATENT DOCUMENTS 2,815,530 12/1957 Alexander ............................. 17/1 S
3,579,713 5/1971 Kang et al. ............................ 17/1 S Primary Examiner—Willie G. Abercrombie
Attorney, Agent, or Firm—Harrington A. Lackey

[57] ABSTRACT

A meat holder for supporting a plurality of elongated strips of meat for skewering with elongated skewer sticks including a pair of opposed platens having opposed elongated meat receiving cavities with longitudinally spaced, transversely extending, opposed ribs projecting from the corresponding cavities to hold the elongated meat strips longitudinally straight within the cavities when the platens are closed. The platens are provided with an elongated stick hole for each meat strip in one end portion of the platens for receiving and guiding an elongated skewer stick, so that the skewer stick will penetrate the entire length of the central portion of the meat strip so that the stick is substantially confined within the meat strip. Preferably the ribs have cam faces opposing the stick holes for directing any misaligned skewer stick toward the center of the meat receiving cavity.

10 Claims, 6 Drawing Figures

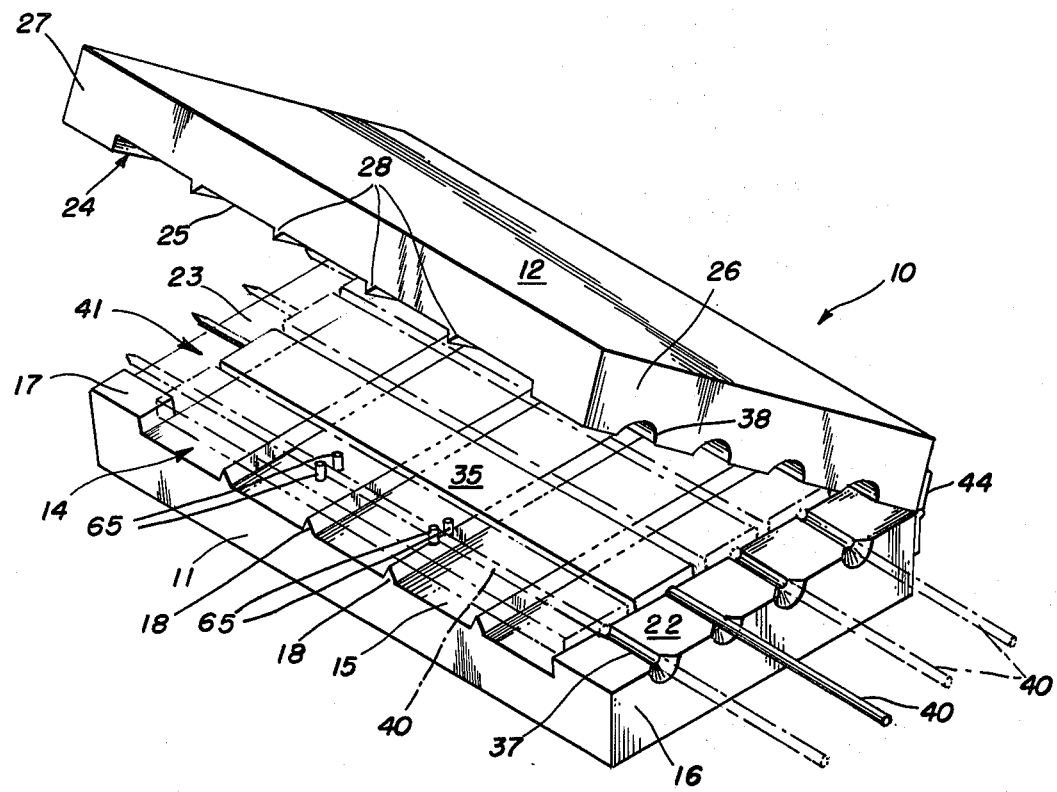
FIG. I
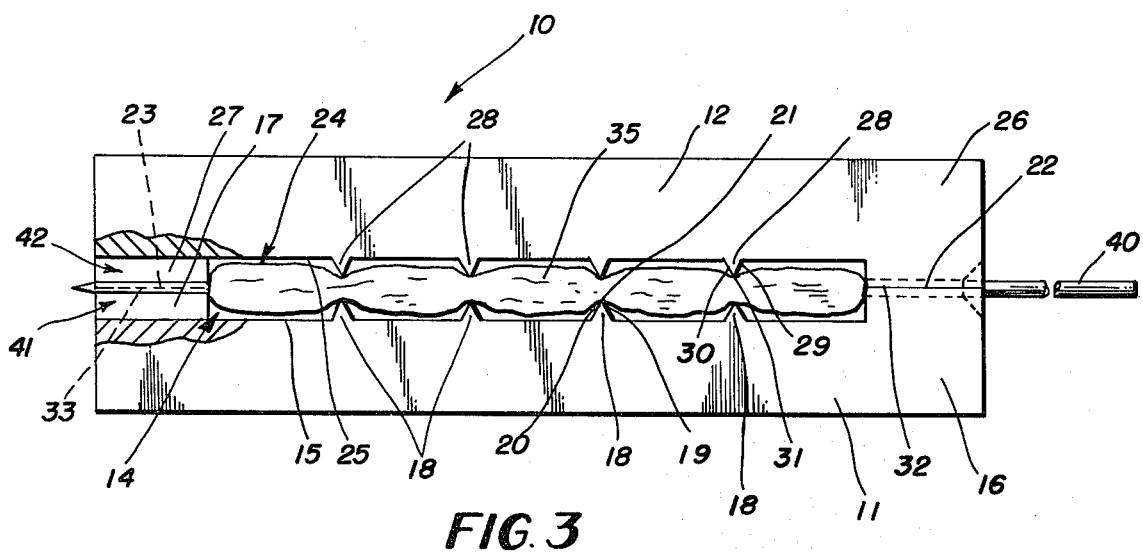
FIG. 3

HEAT STRIP HOLDER FOR SKEWER STICKS

BACKGROUND OF THE INVENTION

This invention relates to a meat holder, and more particularly to a meat holder for supporting elongated strips of meat for skewering with skewer sticks.

One food item which is popular is Hawaiian or Polynesian restaurants in an elongated strip of meat, such as a strip flank steak, which is skewered longitudinally by a skewer stick longer than the meat strip, so that the meat covers one portion of the stick, while an uncovered end portion of the stick is held in the hand for cooking over a fire pot or small brazier.

Conventionally, these skewered meat strips are prepared by hand, one hand holding the meat strip, while the other hand manipulates the stick to skewer the thin meat strips longitudinally.

The process is tedious, slow and somewhat hazardous, since sometimes a hastily thrust skewer stick accidentally penetrates the hand of the operator holding the meat.

Several devices are known for mechanically skewering meat, such as those shown in the following U.S. patents:

U.S. Pat. No. 2,210,765, Mahlke, Aug. 6, 1940
U.S. Pat. No. 2,303,566, Majestic, Dec. 1, 1942
U.S. Pat. No. 2,609,564, Grimm, Sept. 9, 1952
U.S. Pat. No. 2,815,530, Alexander, Dec. 10, 1957
U.S. Pat. No. 2,859,685, Alexander, Nov. 11, 1958
U.S. Pat. No. 3,405,422, Sico et al., Oct. 15, 1968
U.S. Pat. No. 3,579,713, Kang et al., May 25, 1971
U.S. Pat. No. 3,729,774, Chow, May 1, 1973
U.S. Pat. No. 3,766,601, Heighberger, Oct. 23, 1973

The Mahlke U.S. Pat. No. 2,210,765, the Majestic U.S. Pat. No. 2,303,566, and the Grimm U.S. Pat. No. 2,609,564 disclose meat skewering devices in which the meat is cut in small pieces and arranged in the respective meat compartments in layers which are transverse to the trajectory of the skewer, in order to make meat products known as "city chicken" or "chicken legs." The meat compartments utilized in these patents have completely open mold cavities with no projections of any kind, much less any type of transverse ribs.

The Sico et al U.S. Pat. No. 3,405,422 also discloses similar types of open meat compartments for receiving layers of meat for making "city chicken."

The Heighberger U.S. Pat. No. 3,766,601 discloses a single cylindrical mold cavity for receiving and compressing chunks of meat about a skewer stick.

Both of the Alexander U.S. Pat. Nos. 2,815,530 and 2,859,685, the Kang et al U.S. Pat. No. 3,579,713, and the Chow U.S. Pat. No. 3,729,774 disclose skewering devices for impaling elongated strips of meat in undulating waves, so that the skewer sticks are partially exposed to the fire or heat when the skewered strips are cooked.

Although the problem of attempting to protect the uncovered portions of the skewer in an undulating meat strip from the heat and flame was apparently recognized in the Alexander U.S. Pat. No. 2,815,530, nevertheless, this problem was solved in the Alexander patent by merely attempting to cover the major portion of the skewer (column 2, lines 40-42; column 4, lines 4-7).

None of the above cited patents disclose a meat compartment or mold having interior projections for gripping and holding elongated meat strips substantially straight lengthwise of the compartment, while a skewer penetrates the center portion of each meat strip throughout its length, so that the entire longitudinal portion of the skewer coextensive with the meat strip is completely covered and protected from the flame or heat during cooking.

SUMMARY OF THE INVENTION

It is therefore an object of this invention to provide a meat holder for holding one or more elongated strips of meat substantially straight lengthwise within a meat cavity, and including means for guiding a skewer stick to penetrate the meat strip lengthwise so that the skewer stick is substantially confined within the meat.

It is a further object of this invention to provide a meat holder gripping elongated strips of meat for skewering so that no portion of the skewer stick, which is coextensive with the elongated meat strip, is exposed to flame or heat while cooking.

Another object of this invention is to provide a meat holder for skewering elongated meat strips, including a pair of platens defining a meat receiving cavity when the platens are closed. A plurality of longitudinally spaced, transversely extending, opposed ribs project from the upper and lower surfaces of the cavity for engaging and holding the meat strips substantially straight in their lengthwise dimension, and for maintaining the meat strips centered while a skewer stick penetrates the longitudinal center portion of each meat strip.

A further object of this invention is to provide a meat holder for supporting elongated meat strips for skewering, including transverse ribs having inclined cam surfaces for directing misaligned skewer sticks toward the center of the meat strips.

Another object of this invention is to provide a meat holder for supporting elongated meat strips for skewering, including an elongated cavity for receiving one or more elongated meat strips and a stick hole in the end of the holder for each meat strip to accurately guide a skewer through the stick hole and longitudinally through the longitudinal center portion of each meat strip.

Another object of this invention is to provide a meat holder of simple construction for holding elongated meat strips for skewering, in which the skewer sticks may be quickly, accurately and safely thrust through the respective meat strips.

BRIEF DESCRIPTION OF THE DRAWINGS

FIG. 1 is a top front perspective view of one form of meat holder made in accordance with this invention, in which the cover member is raised in an inoperative position and in which the meat strips and skewer sticks are shown in operative position;

FIG. 3 is a side elevation of the meat holder disclosed in FIG. 1 with the cover member closed upon an elongated meat strip skewered by a skewer stick, and with an end portion broken away;

DESCRIPTION OF THE PREFERRED EMBODIMENTS

Figure 2:
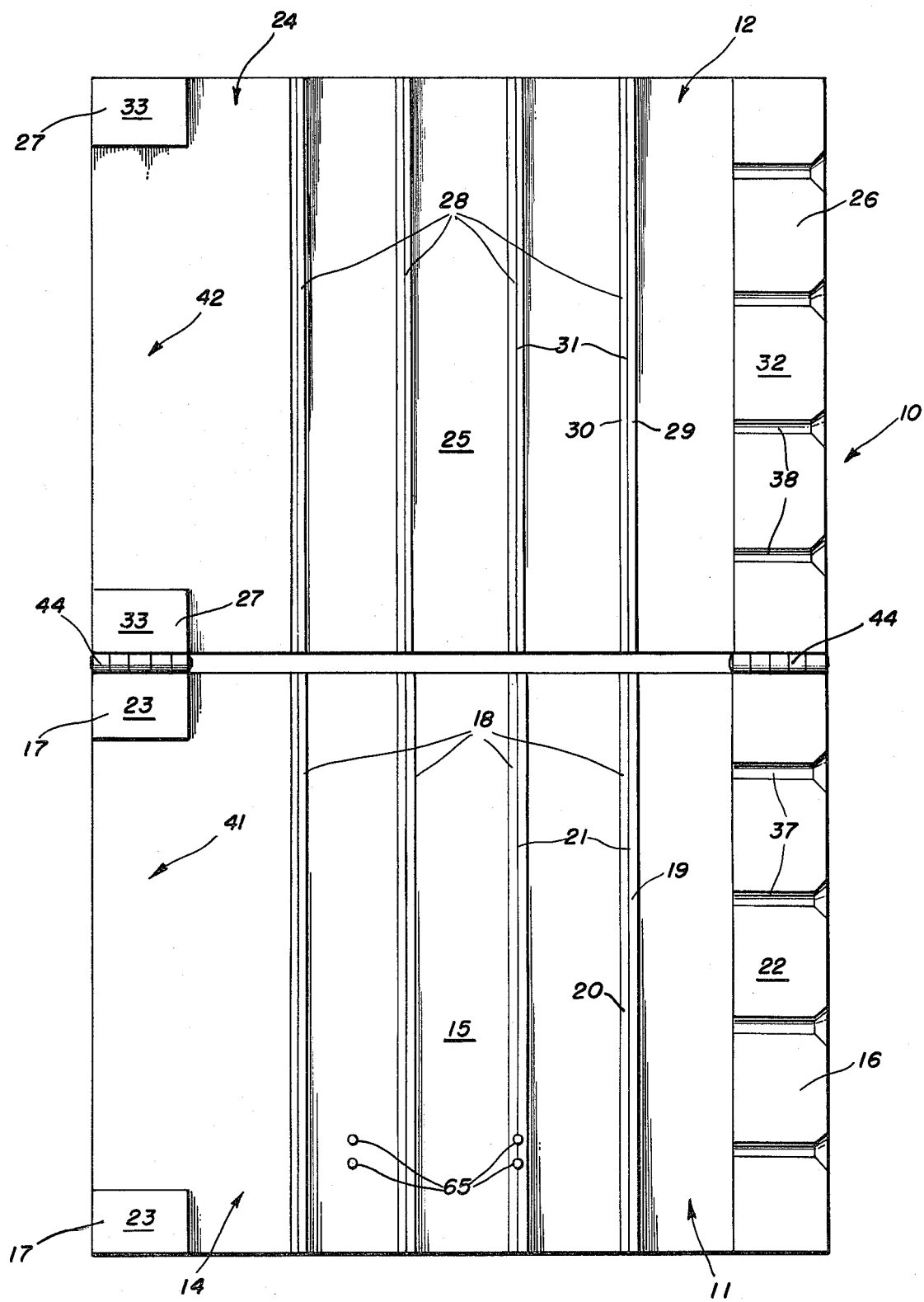
FIG. 2 is a top plan view of the meat holder disclosed in FIG. 1, with the cover member completely open and coplanar with the lower platen.

Referring now to the drawings in more detail, FIGS. 1–4 disclose one embodiment of a meat holder 10 made in accordance with this invention. The meat holder 10 includes a pair of rectangular blocks or platens including a lower platen or base 11 and an upper platen or cover member 12.

The lower platen 11 is channeled or recessed throughout its entire width to form a longitudinal lower cavity 14 having a bottom surface 15. The lower cavity 14 terminates in a front end wall 16 and a pair of transversely spaced rear corner shoulders 17.

Projecting upward from the floor or bottom surface 15 of the lower cavity 14 are a plurality of longitudinally spaced, transversely extending, straight, triangular-shaped lower ribs 18. Each rib 18 includes upward converging front and rear planar cam surfaces 19 and 20 terminating in a straight edge 21. The top edges 21 of the ribs 18 preferably lie in a plane parallel to the bottom cavity surface 15 and at a height above the bottom surface 15 less than the height of the top surfaces 22 and 23 of the respective end wall 16 and corner shoulders 17 above the bottom surface 15.

The upper platen 12 is preferably the mirror image of the lower platen 11. The bottom surface of the upper platen 12 is channeled or recessed throughout its entire width to form an elongated upper cavity 24 having a planar top surface 25. The upper cavity 24 terminates in a front end wall 26 and a pair of transversely spaced rear corner shoulders 27. Upper ribs 28 preferably of identical construction, shape, size and spacing as the lower ribs 18, are formed on the upper surface 25 to project downward the same uniform depth or height as the height of the ribs 18. Moreover, each rib 28 has a front cam surface 29, a rear cam surface 30, and a transverse straight top edge 31 identical to their counterparts in the lower ribs 18.

Furthermore, the height of the upper ribs 28 is less than the height or depth of the bottom surfaces 32 and 33 of the corresponding front end wall 26 and the corner shoulders 27 below the upper surface 25.

Thus, when the upper platen or cover member 12 is in its closed position as disclosed in FIG. 3, the lower cavity 14 and the upper cavity 15 form a meat-receiving compartment or cavity, and the opposed ribs 18 and 28 are spaced apart sufficiently to receive, yet firmly grip, elongated meat strips 35, as best disclosed in FIGS. 1 and 3.

Figure 4:
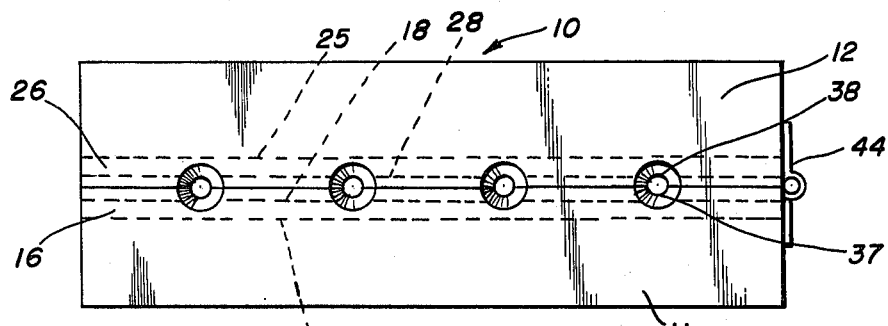
FIG. 4 is a front end elevation of the meat holder disclosed in FIG. 1, with the cover member closed.

Formed in the opposed surfaces 22 and 32 of the front walls 16 and 26 are a plurality of transversely spaced, opposing, semicylindrically shaped, stick hole grooves 37 and 38, which register to form complete stick holes when the cover member 12 is closed upon the lower platen 11, as best disclosed in FIG. 4. The closed stick hole grooves 37 and 38 may have any shape corresponding to the cross-section of the skewer stick 40 to be received. Moreover, the stick holes 37–38 have sufficient length to snugly, but slidably, receive a skewer stick 40 in order to guide and direct the skewer stick 40 longitudinally straight through the corresponding stick hole 37–38, and to substantially maintain the longitudinal direction of the stick 40 as it is thrust lengthwise through the meat holder 10.

The longitudinal axis of each stick hole 37–38 is preferably equidistant between the edges 21 and 31 of the respective ribs 18 and 28, when the lower and upper platens 11 and 12 are in closed position. In this manner, an elongated meat strip 35 is held securely in substantially a straight lengthwise direction within the compartment 14–24, when the platens 11 and 12 are closed, so that a skewer stick 40, extending through its corresponding stick hole 37–38 will accurately penetrate and pass through the entire length of the center portion of the corresponding meat strip 35. Thus, the skewer stick 40, or at least that portion of the skewer stick 40 which is coextensive with the meat strip 35, is completely contained within and covered by the meat strip 35. Accordingly, no portion of the skewer stick 40, coextensive with the meat strip 35, is exposed to the atmosphere, and more particularly is not exposed to flame or heat when the skewered meat strip 35 is being cooked.

In the event a skewer stick 40 is misdirected, or does not truly follow the path coextensive with the longitudinal axis of the stick hole 37–38, then the stick will engage one of the forward cam surfaces 19 or 29 of a corresponding rib 18 or 28, causing the corresponding cam surface 19 or 29 to deflect the skewer stick 40 back toward the central axis of penetration through the meat strip 35.

The rear corner shoulders 17 and 27 may be separated by transverse openings or channels 41 and 42, coplanar with the respective cavity surfaces 15 and 25, if desired, to receive sticks 40 long enough to be thrust through and beyond the meat-receiving cavity 14–24.

The channels 41 and 42 are entirely optional, since generally speaking it is not necessary that the skewer sticks 40 extend any further rearward than the rear end of the cavities 14–24.

The upper platen 12 is preferably secured to the lower platen 11 by hinges 44 along one corresponding longitudinal side of each of the platens 12 and 11. As disclosed in the drawings, one hinge 44 may connect the corresponding ends of front end walls 16 and 26, while the other hinge 44 connects corresponding corner shoulders 17 and 27. Thus, the upper platen 12 may be easily swung between its operative closed position as disclosed in FIGS. 3 and 4, and various open positions, such as those disclosed in FIGS. 1 and 2.

Figure 5:
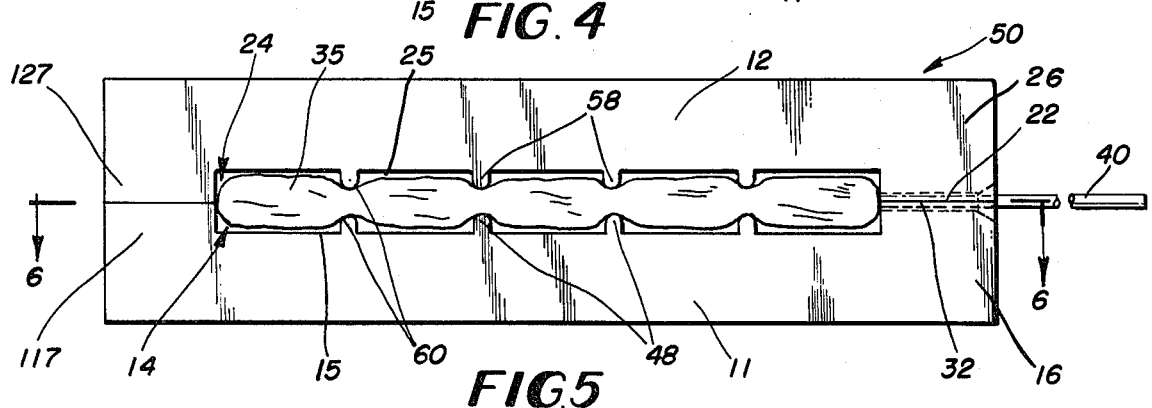
FIG. 5 is a view similar to FIG. 3 of a modified form of the meat holder.
Figure 6:
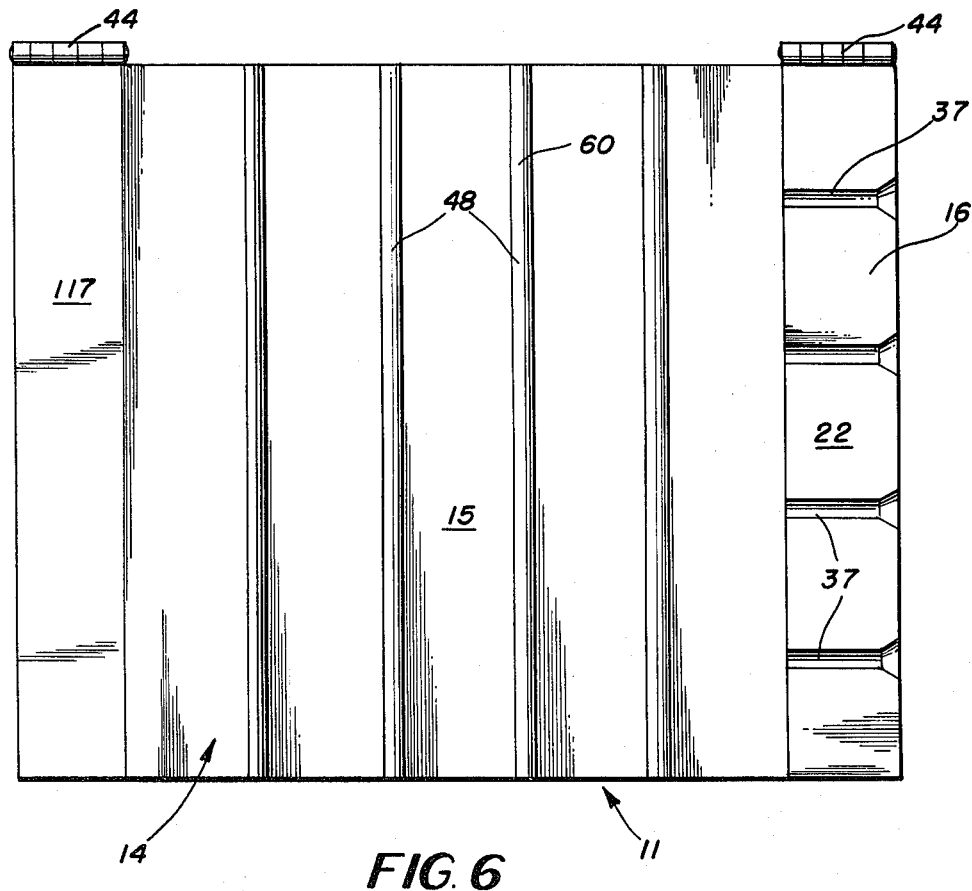
FIG. 6 is a top plan view of the lower platen, taken along the line 6—6 of FIG. 5.

The meat holder 50 disclosed in FIGS. 5 and 6 is identical in construction to the meat holder 10, except in the configuration or shape of the upper and lower ribs 58 and 48 respectively. The ribs 48 and 58 are identical to each other. However, instead of being triangular, as the ribs 18 and 28, each rib 48 and 58 is provided with a projecting convex arcuate surface, such as the semi-cylindrical surface 60 disclosed in FIGS. 5 and 6. The ribs 48 and 58 may have the same longitudinal spacing and depths as the ribs 18 and 28, and oppose each other, as disclosed in FIG. 5, in order to grip the corresponding meat strips 35. The smooth convex surfaces 60 of the ribs 48 and 58 will engage the meat with a smoother gripping surface where severing of the meat might be anticipated. The rib surfaces 60 are sufficiently curved that they will still function as cam surfaces for directing the skewer stick 40 toward the center zone of each meat strip 35, if the stick 40 is moving at too great an angle from its true central longitudinal course through the meat strip 35.

All of the remaining elements of the meat holder 50 disclosed in FIGS. 5 and 6, which are identical to the corresponding elements in the meat holder 10, are identified by identical reference numerals.

In the operation of either of the meat holders 10 and 50, the cover member 12 is opened to a position, such as that disclosed in FIGS. 2, initially. Elongated meat strips 35 are selected and cut, if necessary, and laid lengthwise across the ribs 18 in the lower cavity 14. The strips should be short enough that they do not extend beyond the length of the lower cavity 14. Moreover, each meat strip 35 is aligned lengthwise with a corresponding stick hole groove 37.

Then, the upper platen or cover member 12 is swung to its closed position with the lower surfaces 32 and 33 of the respective end wall 26 and corner shoulders 27 abutting flush against the top surfaces 22 and 23 of the corresponding end wall 16 and corner shoulders 17 of the lower platen 11.

One skewer stick 40 is then selected and inserted through a corresponding stick hole 37–38. The stick 40 is thrust lengthwise through the meat cavity 14–24 so that the stick 40 penetrates lengthwise through the central zone of the meat strip 35. The thrust of the stick 40 is continued until the stick 40 extends entirely through the corresponding meat strip 35. This process is repeated with additional skewer sticks 40 until all of the meat strips 35 have been skewered. The cover member 12 is then raised, and the skewered meat strips 35 removed from the meat holder 10 or 50, and transferred to a location where they will be available for cooking.

If any stick 40 is too small for its corresponding stick hole 37–38, or if the stick 40 is diverted from its true longitudinal course through the center zone of the meat strip 35, sufficiently to abut against any of the ribs 18, 28, 48 or 58, the corresponding rib will divert the stick 40 member 40 back toward its true longitudinal course through its corresponding cam surfaces 19, 29, or 60. If the skewer stick 40 should be thrust through the holder 10 in reverse, the cam surfaces 20 or 30 will deflect misdirected sticks 40 toward the central course of the stick 40.

The spacing between the ribs 18 and 28 and between the ribs 48 and 58 is sufficient to snugly grip or hold the respective meat strips 35 without severing, rupturing, or distorting the corresponding meat strips 35, yet close enough to prevent the meat strip 35 from slipping within the corresponding meat cavity 14–24 as the skewer stick 40 is penetrating the meat strip 35.

Actually, because of the irrigidity of most meats, particularly when they are not frozen, the meat strips 35 will in fact fill most of the space within the cavity 14, and probably most of the space within the cavity 24, so that the ribs 18–28 and 48–58 function as teeth gripping into the flaccid meat surface.

Because of the construction of the platens 11 and 12, and particularly because of the structure, location and spacing of the ribs 18, 28, 48 and 58, the skewer stick 40 will be completely covered, and preferably centrally located, within the meat strip 35 for the full length of that portion of the stick 40 coextensive with the meat strip 35. In this manner, no portion of the meat stick 40 coextensive with the meat strip 35 will be exposed to the flame or heat as the meat strip 35 is cooked over an open flame, or in boiling oil.

As disclosed in FIGS. 5 and 6, a continuous solid rear end wall 117 and 127 may be formed on the lower platens 11 and 12, respectively, in lieu of the corner shoulders 17 and 27, and with the channels 41 and 42 eliminated.

Since skewer sticks 40 used in the preparation of certain Polynesian dishes are made of bamboo wood, some of which is quite flexible, such skewer sticks 40 may be laterally constrained to a true longitudinal course through the meat 35 by guide pins 65, such as those disclosed in FIGS. 1 and 2. The guide pins 65 are arranged in pairs equally spaced on opposite sides of the desired longitudinal course of each stick 40. The spacing between each pair of guide pins is approximately equal to or slightly greater than the corresponding cross-sectional dimension of the stick 40. The pairs of guide pins 65 may be fixed to the bottom surface 15 of the cavity 14 and/or to the ribs 18 to project upward. Guide pins 65 may also be fixed to the top surface 25 of upper cavity 24, if desired. Any number of pairs of guide pins 65 may be utilized at any desired longitudinal spacing along the path or course or the corresponding skewer stick 40.

What is claimed is:

1. A meat holder for supporting elongated strips of meat for skewering with elongated skewer sticks, comprising:
   (a) a base including an elongated lower cavity having a bottom surface, and an end wall, and adapted to receive lengthwise at least one elongated meat strip,
   (b) an elongated cover member having a bottom face and opposite end portions, an upper cavity opening through said bottom face, said cover member being adapted to engage said base in closed position to register said upper and lower cavities in opposing, coextensive relationship, for receiving lengthwise therebetween at least one elongated meat strip,
   (c) a plurality of longitudinally spaced, transversely extending, lower ribs in said lower cavity, said lower ribs projecting toward said cover member in closed position.
   (d) a plurality of longitudinally spaced, transversely extending, upper ribs in said upper cavity projecting toward, spaced from, and opposing said corresponding lower ribs, in said closed position of said cover member,
   (e) at least one stick hole extending longitudinally through said end wall,
   (f) said stick hole having a longitudinal skewer axis extending between the corresponding opposed, spaced apart lower and upper ribs, so that in the closed position of said cover member, said upper ribs terminate above said skewer axis and said lower ribs terminate below said skewer axis,
   (g) said stick hole being adapted to receive an elongated skewer stick therethrough and to guide said skewer stick substantially coaxially of said skewer axis and between said corresponding upper and lower ribs for longitudinal penetration of a substantially straight elongated strip of meat held lengthwise between said upper and lower ribs, so that said stick is substantially confined within the penetrated strip of meat.

2. The invention according to claim 1 in which a portion of said strick hole is formed in said end wall and the other portion of said stick hole is formed in the corresponding end portion of said cover member, whereby said stick hole portions oppose each other to form a complete stick hole when said cover member is in closed position.

3. The invention according to claim 2 in which the transverse dimension of said stick hole is substantially equal to the cross-sectional dimension of a skewer stick to be inserted through said stick hole, and said stick hole is long enough to guide the skewer stick passing through said stick hole in a substantially straight line longitudinally of said cavities.

4. The invention according to claim 2 in which each of said ribs is straight and has opposed rib surfaces converging in the direction of projection of said corresponding ribs.

5. The invention according to claim 4 in which each of said ribs has a triangular cross section.

6. The invention according to claim 4 in which the projecting portion of each of said ribs is convex arcuate.

7. The invention according to claim 1 in which said base and said cover member each have opposed longitudinal sides, and further comprising hinge means joining corresponding longitudinal sides of said base and said cover member to permit said cover member to swing between open and closed positions relative to said base.

8. The invention according to claim 1 in which each of said ribs comprises a cam surface opposing said stick hole and inclined in the direction of projection of said corresponding rib away from said stick hole.

9. The invention according to claim 1 in which each pair of corresponding opposed upper and lower ribs lie in a transverse plane perpendicular to said skewer axis.

10. The invention according to claim 1 in which said lower ribs have upper edges spaced below said skewer axis, when said cover member is closed, and said upper ribs have lower edges spaced above said skewer axis when said cover member is closed, the spacing between the corresponding upper and lower rib edges being less than the thickness of an elongated meat strip supported between said lower and upper rib members.

* * * * *

UNITED STATES PATENT AND TRADEMARK OFFICE
CERTIFICATE OF CORRECTION

PATENT NO. : 4,429,435
DATED : February 7, 1984
INVENTOR(S) : James F. Walls

It is certified that error appears in the above-identified patent and that said Letters Patent are hereby corrected as shown below:

In the title, change "HEAT" to--"MEAT"--

Signed and Sealed this

Fifth Day of November 1985

[SEAL]

Attest:

Attesting Officer

DONALD J. QUIGG

Commissioner of Patents and Trademarks